United States Patent

Chen et al.

[11] Patent Number: 6,043,974
[45] Date of Patent: Mar. 28, 2000

[54] CERAMIC (MULTILAYER) CAPACITOR AND CERAMIC COMPOSITION FOR USE IN SUCH CAPACITOR

[75] Inventors: Zhien C. Chen; Wen-Hsi Lee, both of Kaohsiung; Tseung-Yuen Tseng, Hsinchu, all of Taiwan

[73] Assignee: U.S. Philips Corporation, New York, N.Y.

[21] Appl. No.: 09/082,451

[22] Filed: May 20, 1998

[30] Foreign Application Priority Data

May 30, 1997 [EP] European Pat. Off. ............... 97201617

[51] Int. Cl.$^7$ ............................... H01G 4/06; C04B 35/46
[52] U.S. Cl. ...................... 361/311; 361/321.2; 501/136; 501/137
[58] Field of Search ........................ 361/306.3, 311–313, 361/321.1–321.5, 320, 322, 303–305, 309; 501/134–139; 252/62.6, 62.9 PZ, 62.59

[56] References Cited

U.S. PATENT DOCUMENTS

| | | | |
|---|---|---|---|
| 5,219,812 | 6/1993 | Doi et al. ................................. | 501/138 |
| 5,264,402 | 11/1993 | Sano et al. ............................... | 501/137 |
| 5,397,753 | 3/1995 | Nishiyama et al. ...................... | 501/138 |
| 5,432,136 | 7/1995 | Shibata et al. .......................... | 501/138 |
| 5,510,305 | 4/1996 | Sano et al. ............................... | 501/138 |
| 5,604,166 | 2/1997 | Sasaki et al. ............................ | 501/137 |
| 5,635,435 | 6/1997 | Shibata .................................... | 501/138 |
| 5,659,456 | 8/1997 | Sano et al. ............................... | 361/321.4 |
| 5,763,346 | 6/1998 | Minamikawa et al. .................. | 501/135 |
| 5,818,686 | 10/1998 | Mizuno et al. .......................... | 361/311 |
| 5,822,176 | 10/1998 | Sano et al. ............................... | 361/321.4 |
| 5,841,626 | 11/1998 | Sano et al. ............................... | 361/321.5 |

*Primary Examiner*—Kristine Kincaid
*Assistant Examiner*—Anthony Dinkins
*Attorney, Agent, or Firm*—Norman N. Spain

[57] ABSTRACT

A ceramic composition on the basis of a doped $BaTiO_3$, a ceramic multilayer having such ceramic composition and a monolithic capacitor having such a composition are provided according to the invention. The composition corresponds to the formula $$(Ba_{1-a-b}Ca_aDy_b)(Ti_{1-c-d-e-f}Zr_cMn_dNb_e)_fO_{3+\delta}$$

wherein: $0.00 < a \leq 0.20$
$0.006 \leq b \leq 0.016$
$0.00 < c \leq 0.25$
$0.3b + 0.7e < d \leq 0.014$
$0.001 \leq e \leq 0.005$
$1.000 < f \leq 1.007$.

Capacitors having this ceramic composition as a dielectric material show an increased life-time well as a good resistance against degradation of their electrical properties if used at high temperatures under dc conditions.

3 Claims, 1 Drawing Sheet

CERAMIC (MULTILAYER) CAPACITOR AND CERAMIC COMPOSITION FOR USE IN SUCH CAPACITOR

BACKGROUND OF THE INVENTION

The invention relates to a ceramic composition on the basis of doped $BaTiO_3$, which ceramic composition can suitably be used in capacitors. The invention also relates to a ceramic multilayer capacitor comprising a number of ceramic layers on the basis of a doped $BaTiO_3$ as well as a number of electrode layers predominantly consisting of Ni, the ceramic layers and the electrode layers being alternately stacked to form a multilayer structure which is provided with electric connections at two side faces, said electric connections being connected to a number of the electrode layers. The invention further relates to a ceramic capacitor comprising two electrode layers predominantly consisting of Ni between which layers a dielectric ceramic layer on the basis of a doped $BaTiO_3$ is situated.

Ceramic compositions of the type mentioned in the opening paragraph for use in monolithic ceramic capacitors are known per se. They are described, inter alia, in United States Patent document U.S. Pat. No. 5,264,402. This patent discloses, more particularly, non-reducible dielectric compositions consisting essentially of a modified barium titanate system, said main composition consisting essentially of oxides of Ba, Ca, Ti, Zr and Nb in a specific ratio, to which certain additives A and B have been added. This barium titanate ($BaTiO_3$) system has a so-called perovskite structure. In the case of the known material, a specific quantity of Ca ions is substituted at the Ba sites of the perovskite structure, and specific quantities of Zr ions and Nb ions are substituted at the Ti sites.

The known ceramic compositions show interesting properties which make them suitable for use in so-called 'base metal electrode' capacitors. Firstly, said compositions can be sintered in a reducing atmosphere at relatively low temperature. Therefore, instead of the expensive noble metal Pd the base metal Ni can be used for electrode layers. This relatively low sintering temperature is necessary to preclude that the Ni of the electrode layers melts during the sintering process. Secondly, said known compositions show a relatively high dielectric constant around 10000 and even higher, in combination with relatively low losses.

Capacitors, both of the monolithic type and of the multilayer type, which comprise said known ceramic composition as a dielectric show a clear disadvantage. It has been found that, in practice, the indicated composition does not lead to optimum properties of the capacitor. It has been shown that especially the electrical resistance of the known ceramic composition decreases rapidly if such capacitor is used at a relatively high temperature under direct current (dc) conditions.

SUMMARY OF THE INVENTION

It is an object of the invention to obviate the above disadvantages. The invention more particularly aims at providing a ceramic composition which is suitable for use in multilayer capacitors or monolithic capacitors comprising electrode layers predominantly consisting of Ni, which composition, in addition to the relatively high dielectric constant and the relatively low losses, also shows a strong resistance against dc fields at high temperature. The inventions also aims at providing monolithic and multilayer capacitors comprising said ceramic composition as a dielectric.

These and other objects of the invention are achieved by a ceramic composition on the basis of doped $BaTiO_3$, characterized in that the composition corresponds to the formula $$(Ba_{1-a-b}Ca_aDy_b)(Ti_{1-c-d-e-f}Zr_cMn_dNb_e)_fO_{3+\delta}$$

wherein: $0.00 < a \leq 0.20$
$0.006 \leq b \leq 0.016$
$0.00 < c \leq 0.25$
$0.3b + 0.7e < d \leq 0.014$
$0.001 \leq e \leq 0.005$
$1.000 < f \leq 1.007$.

The invention is based on the unexpected, experimentally gained insight that the incorporation of a small amount of Dy in the Ba sites of the doped $BaTiO_3$ material according to the prior art significantly increases the resistance of the material against degradation of its electrical properties under dc field application at high temperatures. This kind of degradation is a severe problem which suffers many base metal electrode capacitors. It is believed that stabilisation of the charge of Mn in base metal electrode materials is essential to solve this problem. The inventors found that the presence of Dy plays an essential role in such stabilisation.

The incorporation of various dopants in $BaTiO_3$ is necessary to render the inventive material suitable for use as a dielectric material in ceramic base metal electrode capacitors, both of the monolithic type and of the multilayer type. In the present case, Ca and Dy ions are incorporated in the Ba sites and Zr, Mn and Nb ions are incorporated in the Ti sites of the $BaTiO_3$ material. It is noted that the indicated quantities of dopants are calculated as parts of the overall quantity of available Ba and Ti sites in this material.

The presence of Ca and Dy in the indicated quantities at the Ba sites of the ceramic material is regarded as an essential prerequisite to obtain properly functioning ceramic capacitors. As mentioned before, it has been found that maintenance of the electrical properties of the inventive material is strongly dependent on the presence of Dy. If the quantity of Dy is below 0.006 parts or above 0.016 parts, the electrical properties are negatively influenced for capacitors comprising such compositions, especially if they are used at high temperature under dc conditions. Especially the electrical resistance of the ceramic material becomes rather low. This effect causes numerous rejects in highly accelerated life span tests (HALT). The best results are achieved if the quantity of Dy at the Ba sites of the ceramic composition according to the present invention ranges between 0.008 and 0.014 parts.

The presence of a certain amount of Ca at the Ba sites of the presently invented ceramic composition serves to widen the so-called dielectric peak of the ceramic material. However, a quantity above 0.20 parts of Ca in the ceramic material leads to a dielectric constant of said material which is too low. An optimum compromise between both undesirable effects is achieved if the quantity of Ca at the Ba sites of the ceramic material ranges between 0.05 and 0.15 parts.

The presence of Zr, Mn and Nb in the indicated quantities at the Ti sites of the ceramic material is also regarded as an essential prerequisite to obtain a properly functioning ceramic capacitor material. The presence of Zr causes the maximum value of the dielectric constant (the Curie temperature) of $BaTiO_3$ to shift to a lower temperature range. If no Zr is present or if the quantity of Zr is more than 0.25 parts, the Curie temperature is too high or too low, respectively, for practical use. In both cases this leads to a dielectric constant which appears to be too low at the operating temperature of the material. If the quantity of Zr ranges between 0.10 and 0.20 parts, and especially between 0.13 and 0.15 parts, the position of the Curie temperature is optimally chosen for most applications.

Mn appears to play an essential role in the sintering behaviour of the ceramic material of the capacitor in accordance with the invention. Said sintering process takes place in a reducing atmosphere. During sintering, reduction of $BaTiO_3$ may occur. This leads to a reduction of the resistance of the ceramic material formed in the sintering process. This is undesirable. In experiments it has been established that the presence of a specific quantity of Mn at Ti sites of the ceramic material can preclude this undesirable reduction of the ceramic material. It is believed that the ability of Mn to protect against reduction occurs, in particular, in the grains of the ceramic material. If the Mn content is below a minimal amount, no protection takes place. The inventors have found that this minimum amount is strongly related to the amounts of Dy and Nb present in the ceramic composition. Said minimum amount appears to equal 0.3b+0.7e. If, on the other hand, the quantity of Mn exceeds 0.014 parts, the life span of the ceramic appears to be reduced considerably.

The ceramic material of the ceramic capacitors in accordance with the invention should also contain a small quantity of Nb. The presence of this element has a positive effect on the life span of the ceramic material, and thus on the service time of the capacitors comprising such material. As mentioned before, said life span is determined by means of highly accelerated life tests (HALT). If the material contains less than 0.001 parts of Nb, the life span-extending effect is insufficient. If the material contains more than 0.005 parts of Nb, the electric resistance of the material decreases. This is undesirable. Preferably, the quantity of Nb is chosen in the range between 0.002 and 0.004 parts.

As there is an unequal number of Ti sites and Ba sites (f is unequal to zero), the number of O sites is not equal to 3. The deviation from 3 is indicated in the formula by $\delta$, which has a small value.

The invention also relates to a ceramic multilayer capacitor comprising a number of ceramic layers on the basis of a doped $BaTiO_3$ as well as a number of electrode layers consisting predominantly of Ni, the ceramic layers and the electrode layers being alternately stacked to form a multilayer structure which is provided with electric connections at two side faces, said electric connections being connected to a number of the electrode layers. This ceramic multilayer is characterized in that the composition of the main component of the doped $BaTiO_3$ corresponds to the formula

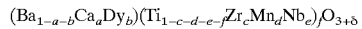

$(Ba_{1-a-b}Ca_aDy_b)(Ti_{1-c-d-e-f}Zr_cMn_dNb_e)_fO_{3+\delta}$ wherein: $0.00 < a \leqq 0.20$
$0.006 \leqq b \leqq 0.016$
$0.00 < c \leqq 0.25$
$0.3b+0.7e < d \leqq 0.014$
$0.001 \leqq e \leqq 0.005$
$1.000 < f \leqq 1.007$.

The invention further relates to a ceramic capacitor comprising two electrode layers consisting predominantly of Ni between which layers a dielectric ceramic layer on the basis of a doped BaTiO3 is situated. The monolithic capacitor is characterized in that the composition of the main component of the doped BaTiO3 corresponds to the formula

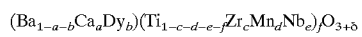

$(Ba_{1-a-b}Ca_aDy_b)(Ti_{1-c-d-e-f}Zr_cMn_dNb_e)_fO_{3+\delta}$ wherein: $0.00 < a \leqq 0.20$
$0.006 \leqq b \leqq 0.016$
$0.00 < c \leqq 0.25$
$0.3b+0.7e < d \leqq 0.014$
$0.001 \leqq e \leqq 0.005$
$1.000 < f \leqq 1.007$.

Multilayer capacitors and monolithic capacitors comprising a dielectric ceramic layers as defined by the formula show a relatively high dielectric constant, relatively low losses as well as a relatively high life span in highly accelerated life tests.

It is noted that, for clarity, the parts shown in the Figures are not drawn to scale.

DETAILED DESCRIPTION OF THE INVENTION

These and other aspects of the invention will be apparent from and elucidated with reference to the embodiments described hereinafter.

Figure 1:
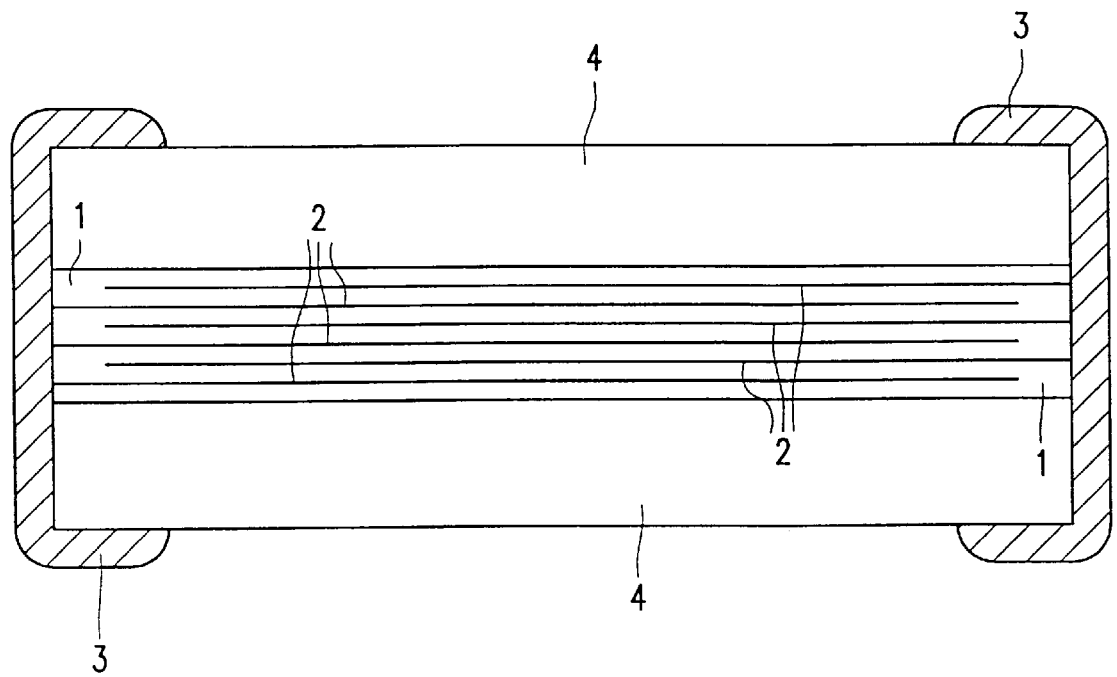
FIG. 1 is a schematic, sectional view of a capacitor of the multilayer type in accordance with the invention.

FIG. 1 shows a multilayer capacitor in accordance with the present invention. This capacitor comprises a number of ceramic layers 1 on the basis of a doped $BaTiO_3$. The capacitor also comprises a number of electrode layers 2 which consist predominantly of Ni. The capacitor additionally has two electric connections 3 which, in this case, are provided on two oppositely located side faces of the capacitor. These connections contain a solderable material, for example copper. In practice, the electrode layers are provided on a ceramic foil by means of screen printing, whereafter a number of these screen-printed foils are stacked. As shown in the FIG. 1, the ceramic foils are stacked so that successive electrode layers are connected alternately to the one or the other electric connection.

For clarity, only 6 electrode layers are shown in FIG. 1. In practice, ceramic multilayer capacitors comprise minimally ten and maximally several hundred electrode layers. Their thickness typically ranges from approximately 0.5 to 2.0 micrometers. The thickness of the ceramic foils typically ranges from 5 to 20 micrometers. In practice, the multilayer capacitors are provided with a protective layers 4 on the upper side and the lower side of the stacked, printed foils. This protective layer is usually composed of a number of unprinted ceramic foils which, during stacking of the printed foils, are incorporated in the stack.

The ceramic multilayer capacitors in accordance with the invention are manufactured as follows. First, a powder mixture is prepared by mixing powders of oxides and/or carbonates of the desired metals in quantities corresponding to the intended composition. In practise, $BaCO_3$, $CaCO_3$, $TiO_2$, $ZrO_2$, $MnCO_3$, $Dy_2O_3$, and $Nb_2O_5$ are used for this purpose. This powder mixture is suspended in 2-propanol to which a small quantity of a dispersing agent is added. The suspension is ground in a ball-mill with $ZrO_2$ balls for about 20 hours, so that powder particles having an average size below 0.4 micrometer are obtained. Subsequently, the powder is dried.

Next, the dried powder is calcined in air for about 4 hours at approximately 1100° C. This results in the desired, doped BaTiO$_3$. This calcined powder is ball-milled again for several hours. The powder thus formed has an average particles size below 1.0 micrometer. A binder solution with a dispersant is added to this powder. Subsequently, green, ceramic foils having a thickness of, for example, 40 micrometers are drawn from this powder-binder mixture. Electrode layers are screen printed on these foils by means of techniques which are known per se. For this purpose, use is made of a screen-printing paste which contains metal particles which are predominantly composed of Ni. The metal content of such a paste consists for at least 90 wt. %, preferably at least 98 wt. %, of Ni. Sintered electrode layers of such pastes are considered to consist predominantly of Ni. The layer thickness of the non-sintered electrode layers is approximately 2 micrometers.

Subsequently, printed foils having a desired size are stacked in such a manner that the electrode layers of the even layers and of the odd layers are slightly displaced relative to each other. The stacked foils are uniaxially subjected to a high pressure (approximately 300 bar) at an increased temperature (approximately 80° C.) to form a multilayer structure. This structure is subsequently broken in one direction to form rods and in a second direction (at right angles to the first direction) to form separate multilayer-capacitor bodies. These bodies are sintered in a reducing (hydrogen/nitrogen) atmosphere at about 1300° C. for about 2 hours.

Finally, two oppositely located surfaces of the multilayer capacitor bodies are provided with electric connections of copper by means of dip coating. These connections are galvanically reinforced and provided with a solderable NiSn alloy. The mechanical and electrical properties of the ceramic multilayer capacitors thus produced can be subsequently measured.

Figure 2:
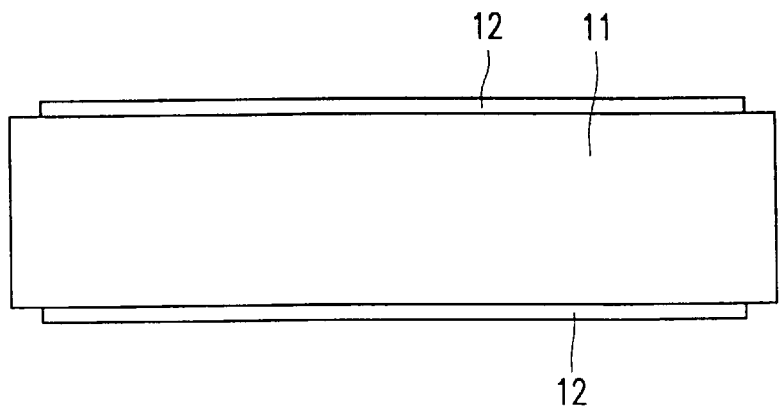
FIG. 2 is a schematic, sectional view of a capacitor of the monolithic type in accordance with the invention.

FIG. 2 shows a monolithic capacitor according to the present invention. This capacitor comprises a monolithic disc 11 made of a ceramic composition the basis of a doped BaTiO$_3$ as claimed. The capacitor also comprises two electrode layers 12 which consist predominantly of Ni. Said electrode layers 12 are applied on the two main surfaces of the disc 11 by common techniques, preferably by means of screen printing. On said electrode layers, additional layers may be provided, f.i. layers comprising a solderable material, for example copper. Electrical leads may be soldered to said additional layers.

The monolithic capacitors according to the present invention are manufactured as follows. First a calcined powder mixture is made as described before for multilayer capacitors. However, instead of making sheets, discs are pressed from this powder, which discs are subsequently sintered in a reducing (hydrogen/nitrogen) atmosphere at about 1300° C. for about 2 hours. After sintering, the main surfaces of the discs are ground and polished for electrical property measurements. Electrode layers consisting of predominantly Ni are finally applied on said main surfaces of the discs by means of screen printing.

Below, a number of experiments are described, which demonstrate the advantageous aspects of the presently invented compositions as well as the advantages of their use in ceramic capacitors of the multilayer type and of the monolithic type.

Table 1 depicts a number of dielectric compositions 1–5, which are used in ceramic multilayer capacitors. These capacitors comprise a stack of 18 layers (thickness 15 micrometer) of ceramic material, the central 10 layers of the stack being provided with Ni electrodes (thickness about 1 micrometer). The capacitors were dimensioned according to the so-called 1206 size. Table 2 depicts a number of electrical properties of the capacitors with the dielectric compositions as described in table 1. More particularly, the capacitance C (nF at 25° C.), the tanD losses (percentage), the insulation resistance IR (M.Ohm) and the life time L (hours) under HALT-conditions (27 V/micrometer at 140° C.) are shown.

TABLE 1

| item | a | c | f | b | d | e |
|---|---|---|---|---|---|---|
| 1 | 0.04 | 0.14 | 1.003 | 0.012 | 0.01 | 0.004 |
| 2 | 0.13 | 0.14 | 1.001 | 0.012 | 0.01 | 0.004 |
| 3 | 0.13 | 0.14 | 1.003 | 0.0 | 0.01 | 0.004 |
| 4 | 0.13 | 0.14 | 1.003 | 0.006 | 0.01 | 0.004 |
| 5 | 0.13 | 0.14 | 1.003 | 0.012 | 0.01 | 0.0 |

TABLE 2

| C | tanD | I.R. | L (hrs) |
|---|---|---|---|
| 163.6 | 1.66% | 3.8*E5 | >100 |
| 94 | 2.34% | 1.40*E5 | >100 |
| 62 | 5.84% | 0.27*E5 | 0 |
| 109 | 4.62% | 0.45*E5 | 45 |
| 96 | 3.33% | 2.01*E5 | 28 |

In these tables, example 3 clearly shows that the absence of Dy (b=0) in the doped BaTiO$_3$ results in a short life time of the capacitor if used at high temperature under dc conditions. If Dy is present, the life time under these conditions increases dramatically. Example 4 shows that the use of a small amount of Dy (b=0.006) increases the life-time already to 45 hours in HALT tests. However, the best results are obtained by using higher amounts of Dy (examples 1 and 2). It is also observed that the insulation resistance IR of examples 3 and 4, having no Dy and low Dy content respectively, is much lower than of examples 1 and 2 having higher Dy content. Example 5 demonstrates the importance of the presence of Nb in the inventive material. The life-time in HALT tests appears to be drastically reduced if no Nb is present (e=0).

Table 3 depicts a number of dielectric compositions 11–21, which are used in ceramic monolithic capacitors. Said capacitors comprises a disc having a thickness of 1.0 mm and a radius of 7.5 mm. Table 4 depicts a number of electrical properties of the capacitors described in table 3. More particularly, the dielectric constant K (at 25° C.), the tanD losses (percentage), the insulation resistance IR (M.Ohm) and the density D of the dielectric composition are given.

TABLE 3

| item | a | c | f | b | d | e |
|---|---|---|---|---|---|---|
| 11 | 0.04 | 0.14 | 1.003 | 0.012 | 0.01 | 0.004 |
| 12 | 0.09 | 0.14 | 1.003 | 0.012 | 0.01 | 0.004 |
| 13 | 0.13 | 0.14 | 1.000 | 0.012 | 0.01 | 0.004 |
| 14 | 0.13 | 0.14 | 1.008 | 0.012 | 0.01 | 0.004 |
| 15 | 0.13 | 0.14 | 1.003 | 0 | 0.01 | 0.004 |
| 16 | 0.13 | 0.14 | 1.003 | 0.017 | 0.01 | 0.004 |
| 17 | 0.13 | 0.14 | 1.003 | 0.012 | 0.007 | 0.004 |
| 18 | 0.13 | 0.14 | 1.003 | 0.012 | 0.015 | 0.004 |
| 19 | 0.13 | 0.14 | 1.003 | 0.012 | 0.01 | 0.007 |
| 20 | 0.13 | 0.14 | 1.001 | 0.012 | 0.01 | 0.004 |
| 21 | 0.13 | 0.14 | 1.005 | 0.012 | 0.01 | 0.004 |

TABLE 4

| K | tanD | I.R. | D |
|---|---|---|---|
| 13000 | 0.2% | 4.3*E5 | 5.90 |
| 12050 | 0.3% | 3.9*E5 | 5.86 |
| 8975 | 1.98% | 1.9*E3 | 5.56 |
| 12350 | 1.84% | 8.8*E2 | 5.81 |
| 10190 | 0.93% | 7.5*E3 | 5.72 |
| 10766 | 0.97% | 8.3*E2 | 5.78 |
| 12500 | 2.35% | 5.6*E1 | 5.72 |
| 6500 | 0.15% | 4.2*E5 | 5.82 |
| 13560 | 2.81% | 2.5*E2 | 5.80 |
| 9850 | 0.35% | 5.1*E5 | 5.79 |
| 11022 | 0.62% | 2.5*E5 | 5.82 |

Example 15 and 16 demonstrate that a low insulation resistance is obtained if the Dy-content is lower respectively higher than the claimed range. HALT tests (data not shown) confirm that the life-time of these capacitors is relatively low. Example 18 clearly demonstrates that a low dielectric constant K is obtained if the Mn-content is larger than the claimed upper limit of 0.014. Example 17 proves that a too low Mn content (i.e. lower than 0.3b+0.7d) is accompanied with a low insulation resistance IR.

As relates to the Ba/Ti-sites ratio, example 13 proves that a to low ratio (f=1.000) is correlated with a relatively small insulation resistance. The too high Ba/Ti-sites ratio of example 14 (f=1.008) on the other hand also results in a relatively small insulation resistance.

As concerns the Nb content of the compositions, example 19 teaches that too much Nb (e=0.007) causes a relatively low insulation resistance. A low insulation resistance of capacitors generally is accompanied with a short life-time.

Good examples of the present invention are depicted as compositions 1 and 2 for the multilayer capacitors and examples 11, 12, 20 and 21 for the monolithic capacitors.

From the above experiments, it can be concluded that the life span of bme-capacitors according to the prior art is strongly enhanced if a small but effective amount of Dy is incorporated in the dielectric composition.

We claim:

1. A ceramic composition on the basis of doped $BaTiO_3$, characterized in that the composition corresponds to the formula $$(Ba_{1-a-b}Ca_aDy_b)(Ti_{1-c-d-e-f}Zr_cMn_dNb_e)_fO_{3+\delta}$$

wherein: $0.00 < a \leq 0.20$
$0.006 \leq b \leq 0.016$
$0.00 < c \leq 0.25$
$0.3b+0.7e < d \leq 0.014$
$0.001 \leq e \leq 0.005$
$1.000 < f \leq 1.007$,
and $\delta$ is the deviation of the number of O sites from 3.

2. A ceramic multilayer capacitor comprising a number of ceramic layers on the basis of a doped $BaTiO_3$ as well as a number of electrode layers consisting predominantly of Ni, the ceramic layers and the electrode layers being alternately stacked to form a multilayer structure which is provided with electric connections at two side faces, said electric connections being connected to a number of the electrode layers, characterized in that the doped $BaTiO_3$ has a composition which corresponds to the formula $$(Ba_{1-a-b}Ca_aDy_b)(Ti_{1-c-d-e-f}Zr_cMn_dNb_e)_fO_{3+\delta}$$

wherein: $0.00 < a \leq 0.20$
$0.006 \leq b \leq 0.016$
$0.00 < c \leq 0.25$
$0.3b+0.7e < d \leq 0.014$
$0.001 \leq e \leq 0.005$
$1.000 < f \leq 1.007$
and $\delta$ is the deviation of the number of O sites from 3.

3. A ceramic capacitor comprising two electrode layers consisting predominantly of Ni between which layers a dielectric ceramic layer on the basis of a doped BaTiO3 is situated, characterized in that the doped BaTiO3 corresponds to the formula has a main component which has a composition which $$(Ba_{1-a-b}Ca_aDy_b)(Ti_{1-c-d-e-f}Zr_cMn_dNb_e)_fO_{3+\delta}$$

wherein: $0.00 < a \leq 0.20$
$0.006 \leq b \leq 0.016$
$0.00 < c \leq 0.25$
$0.3b+0.7e < d \leq 0.014$
$0.001 \leq e \leq 0.005$
$1.000 < f \leq 1.007$,
and $\delta$ is the deviation of O sites from 3.

* * * * *